(No Model.)

W. B. CARPENTER.
FISHING LINE REEL.

No. 368,277.  Patented Aug. 16, 1887.

WITNESSES:
Gustav Dieterich
E. A. Dieterich

INVENTOR
William B. Carpenter
BY George Cook
ATTORNEY

UNITED STATES PATENT OFFICE.

WILLIAM B. CARPENTER, OF NEWARK, NEW JERSEY, ASSIGNOR TO THE CELLULOID NOVELTY COMPANY, OF NEW YORK, N. Y.

FISHING-LINE REEL.

SPECIFICATION forming part of Letters Patent No. 368,277, dated August 16, 1887.

Application filed May 2, 1887. Serial No. 236,816. (No model.)

*To all whom it may concern:*

Be it known that I, WILLIAM B. CARPENTER, a citizen of the United States, and a resident of Newark, in the county of Essex and State of New Jersey, have invented certain new and useful Improvements in Fishing-Reels, of which the following is a specification.

The invention has relation to an improvement in multiplying-reels, and has for its object the production of a reel which is simple in construction and has other advantages, as hereinafter set forth.

By the employment of an enlarged side plate, as hereinafter described, I am enabled to arrange the gear-wheels of the reel in such a way that the driving-wheel is located below the wheel upon the spool, whereby, first, the spool may be very rapidly actuated; second, the finger-piece of the reel is made to occupy a very convenient position; third, increased length is given to the spindle or axis of the driving-wheel, and, fourth, the construction of the reel is greatly simplified.

Figure 1:
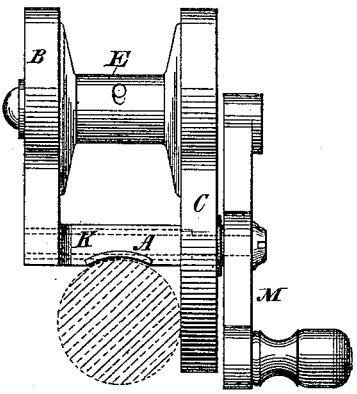
Figure 4:
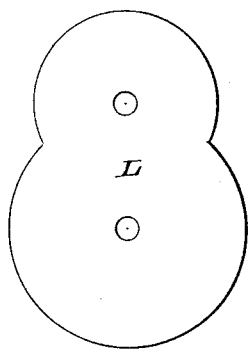
Figure 2:
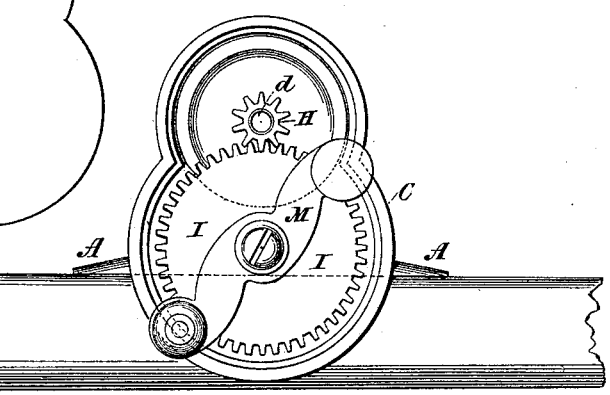
Figure 3:
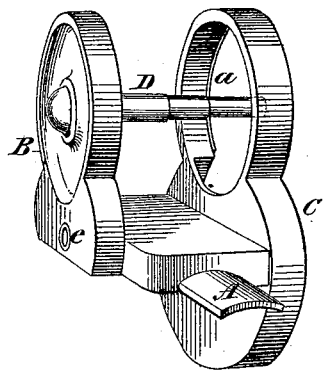

In the accompanying drawings, Figure 1 is an end view of my improved reel. Fig. 2 is a view in side elevation with the outer protecting-plate removed. Fig. 3 is a perspective view of the reel with the spool, plate, wheels, and handle removed; and Fig. 4 is a detached view of the side plate for retaining the parts in position.

A denotes the attachment-plate of the reel, which is of usual construction, adapted to bear on and be secured to the rod or pole, and to which are secured the plates B C, in the former of which is secured one end of the shaft D, adapted to support the spool E. By preference, the inner side of the plate B is recessed to receive the end of the spool, and is otherwise appropriately adapted to its offices.

The plate C, which is a very important part of the invention, has its upper portion removed, as shown at *a* in Fig. 3 of the drawings, so that the spool E may be introduced and withdrawn through it.

H is a pinion rigidly attached to the hollow spindle *d* of the spool, and which, when the spool is in position, meshes with the driving-wheel I, as hereinafter described.

To accomplish the objects of the invention the plate C is made larger than usual, being extended downward below the plate A, so that the hollow bearing *e* for the shaft K of the driving-wheel I may be carried completely through said plate A, whereby, as is well understood, important and very desirable results are accomplished. The plate is recessed to accommodate the wheels, as shown, and otherwise appropriately constructed to perform the functions which it is intended to carry out.

I is the driving-wheel, which is of usual construction, and rigidly secured to its spindle or axle K, extending through the hollow bearing *e*, which latter passes through the plates A, B, and C. The driving-wheel I is adapted in size to the pinion H, so that when it is in position it meshes with the latter and imparts its motion to the spool. To one end of the shaft of the driving-wheel I is attached the crank M and handle, which are of usual construction. The shaft K passes through the plate L, provided for the purpose of retaining the spool and other operating parts in position, and is secured in place on the plate C in any convenient way.

My improved reel may be made of metal, rubber, "celluloid," or any other suitable material, and according to methods well understood in the art to which the invention relates. If rubber or celluloid are used, it will probably be expedient to construct the spindles of metal. The wheels, however, I have found may be made of celluloid. I attach importance to the employment of the spindle of the driving-wheel in the manner described. By preference an aperture will be made extending completely through the reel from side to side, and the said spindle made of corresponding length. It is possible, however, to imperfectly effect the number of advantages of the invention by making said spindle shorter, so that it will extend only part way through the attachment-plate A, or even made to have a bearing in the plate C.

What I claim is—

1. A reel having a driving-wheel, the shaft of which passes through the attachment-plate bearing on and secured to the rod or pole, substantially as set forth.

2. In a reel, the combination, with a frame, of a spool and a driving-wheel meshing with a pinion connected with the spool, the bearing for the shaft of said driving-wheel passing through the attachment-plate, substantially as set forth.

3. A reel constructed with a frame consisting of an attachment-plate and two side plates, a spool, and a driving-wheel, the bearing for which passes through the said frame, substantially as set forth.

4. A reel constructed with a frame consisting of the plates A, B, and C, a spool having a pinion attached thereto, a driving-wheel meshing with said pinion and having its shaft passing through said frame, a handle for turning said driving-wheel, and the inclosing-plate L, the above parts being constructed and adapted to operate substantially as described.

5. A reel-frame consisting of the plates A, B, and C, constructed substantially as described and having the hollow bearing $e$ passing entirely through each of said plates for the reception of the shaft of the driving-wheel, substantially as set forth.

Signed at New York, in the county of New York and State of New York, this 25th day of April, A. D. 1887.

WILLIAM B. CARPENTER.

Witnesses:
GEORGE COOK,
FRED C. RIECKERS.